United States Patent
Armstrong et al.

(10) Patent No.: US 11,565,489 B2
(45) Date of Patent: Jan. 31, 2023

(54) WETTING LAYERS FOR OPTICAL DEVICE ENHANCEMENT

(71) Applicant: Applied Materials, Inc., Santa Clara, CA (US)

(72) Inventors: Karl J. Armstrong, Sunnyvale, CA (US); Jinxin Fu, Fremont, CA (US); Wilson Banez, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 510 days.

(21) Appl. No.: 16/253,661

(22) Filed: Jan. 22, 2019

(65) Prior Publication Data

US 2019/0232586 A1    Aug. 1, 2019

Related U.S. Application Data

(60) Provisional application No. 62/637,733, filed on Mar. 2, 2018, provisional application No. 62/630,591, filed (Continued)

(51) Int. Cl.
*B29D 11/00* (2006.01)

(52) U.S. Cl.
CPC .. *B29D 11/00788* (2013.01); *B29D 11/00211* (2013.01); *B29D 11/00865* (2013.01)

(58) Field of Classification Search
CPC ..... C23C 14/0652; C23C 14/08; C23C 14/14; C23C 16/345; C23C 16/402; C23C 16/40; C23C 16/06; C23C 14/021; C23C 14/564; C03C 17/09; C03C 17/3618; C03C 17/00–42; G02B 1/10; G02B 5/0808;

(Continued)

(56) References Cited

U.S. PATENT DOCUMENTS

| 5,877,086 A | 3/1999 | Aruga |
| 6,262,847 B1 * | 7/2001 | Tsukamoto .......... G02B 5/0858 359/359 |

(Continued)

FOREIGN PATENT DOCUMENTS

| CN | 103874667 A | 6/2014 |
| CN | 104205302 A | 12/2014 |

(Continued)

OTHER PUBLICATIONS

International Search Report and Written Opinion for Application No. PCT/US2019/014250 dated May 8, 2019.

(Continued)

*Primary Examiner* — Elizabeth A Burkhart
(74) *Attorney, Agent, or Firm* — Patterson + Sheridan, LLP

(57) ABSTRACT

Embodiments described herein relate to methods and materials for optical device fabrication. In one embodiment, a method of fabricating an optical device is provided. The method includes depositing a dielectric film on a substrate, depositing a wetting layer on the dielectric film, and depositing a metal containing film on the wetting layer. In another embodiment, an optical device is provided. The device includes a substrate, a dielectric film deposited on and contacting the substrate, a wetting layer deposited on and contacting the dielectric film, and a metal containing film deposited on and contacting the wetting layer.

14 Claims, 2 Drawing Sheets

Related U.S. Application Data on Feb. 14, 2018, provisional application No. 62/623,382, filed on Jan. 29, 2018.

(58) Field of Classification Search
CPC ........ B29D 11/00788; B29D 11/00211; B29D 11/00865
USPC .................................................. 427/162–169
See application file for complete search history.

(56) References Cited

U.S. PATENT DOCUMENTS

| | | | |
|---|---|---|---|
| 6,515,335 | B1 | 2/2003 | Christiansen et al. |
| 6,934,085 | B2 * | 8/2005 | Stachowiak .......... G02B 5/0858 |
| | | | 348/E5.138 |
| 7,598,529 | B2 | 10/2009 | Ploessl et al. |
| 8,525,232 | B2 | 9/2013 | Nogami et al. |
| 9,494,717 | B2 | 11/2016 | Reymond et al. |
| 2002/0019783 | A1 | 2/2002 | Choi |
| 2002/0060321 | A1 | 5/2002 | Kazlas et al. |
| 2003/0043464 | A1 * | 3/2003 | Dannenberg ........... G02B 1/116 |
| | | | 359/585 |
| 2007/0041111 | A1 * | 2/2007 | Krasnov ............. C03C 17/3663 |
| | | | 359/883 |
| 2008/0003816 | A1 | 1/2008 | Kim |
| 2011/0070417 | A1 | 3/2011 | Reutler et al. |
| 2014/0090974 | A1 * | 4/2014 | Ballet .................. C03C 17/366 |
| | | | 204/192.15 |
| 2014/0272465 | A1 * | 9/2014 | Lienhart ............. C03C 17/3657 |
| | | | 428/673 |
| 2015/0291812 | A1 * | 10/2015 | Anapolsky .............. C23C 14/04 |
| | | | 428/336 |
| 2015/0321951 | A1 * | 11/2015 | Alzate ..................... C03C 17/36 |
| | | | 428/34 |
| 2016/0054060 | A1 * | 2/2016 | Segawa ................. F26B 25/001 |
| | | | 34/618 |
| 2017/0059750 | A1 * | 3/2017 | Diguet ..................... G02B 5/26 |

FOREIGN PATENT DOCUMENTS

| | | |
|---|---|---|
| CN | 104603914 A | 5/2015 |
| JP | H06199544 A | 7/1994 |
| JP | 2014508711 A | 4/2014 |
| TW | I535021 B | 5/2016 |
| WO | 2001041544 | 6/2001 |
| WO | 2009111245 A1 | 9/2009 |
| WO | 2017035336 A1 | 3/2017 |

OTHER PUBLICATIONS

Taiwan Office Action for Application No. 108102366 dated Aug. 23, 2019.
Chinese Office Action dated Sep. 7, 2021, for Chinese Patent Application No. 201980012469.8.
EPO Extended European Search Report dated Sep. 15, 2021, for European Patent Application No. 19743523.3.
Japanese Office Action dated Sep. 7, 2021, for Japanese Patent Application No. 2020-541389.
Chinese Office Action dated Dec. 20, 2021, for Chinese Patent Application No. 201980012469.8.
Japanese Office Action dated Apr. 19, 2022, for Japanese Patent Application No. 2020-541389.
Korean Office Action dated May 30, 2022, for Korean Patent Application No. 10-2020-7024606.

* cited by examiner

WETTING LAYERS FOR OPTICAL DEVICE ENHANCEMENT

CROSS-REFERENCE TO RELATED APPLICATIONS

This application claims benefit of U.S. provisional patent application Ser. No. 62/637,733, filed Mar. 2, 2018, U.S. provisional patent application Ser. No. 62/630,591, filed Feb. 14, 2018, and U.S. provisional patent application Ser. No. 62/623,382, filed Jan. 29, 2018, which are herein incorporated by reference in their entirety.

BACKGROUND

Field

Embodiments of the present disclosure generally relate to materials and methods for optical device fabrication.

Description of the Related Art

Optical devices, such as lenses or the like, are engineered to exhibit certain desirable characteristics. Examples of optical device characteristics include light reflectivity and light transmissivity. Conventional optical devices, such as lenses having coating materials deposited thereon, may be sufficient for certain applications. However, advanced optical devices, such as those for utilization in advanced imaging and semiconductor applications, often fail to perform as intended with conventional coatings.

Moreover, even advanced optical devices, such as those that utilize alternating layers of dielectric and metal films, may not perform adequately due to the inherent characteristics of the materials utilized to form the advanced optical devices. For example, optical devices having thin dielectric and metal films arranged in an alternating manner may suffer from delamination of the metal from the dielectric or from incomplete metal coverage over the dielectric. While thicker metal films may be utilized to achieve improved coalescence of the metal over the dielectric film, full coalescence of the metal is not typically achieved until the metal film is several 10's of nanometers thick, which is often too thick for advanced optical device applications.

Accordingly, what is needed in the art are improved methods and materials for optical devices.

SUMMARY

In one embodiment, a method of fabricating an optical device is provided. The method includes depositing an oxide-containing dielectric film on a substrate, depositing a wetting layer on and in contact with the dielectric film, and depositing a metal-containing film on and in contact with the wetting layer. The metal-containing film is formed of a reflective metallic material including one or more of aluminum, silver, and gold.

In one embodiment, a method of fabricating an optical device includes transferring a substrate into a process chamber, cleaning a surface of the substrate by sputter etching, forming an oxide-containing dielectric layer on the substrate, forming a first wetting layer over the dielectric layer, forming a metal layer over the first wetting layer, and forming a second wetting layer over the metal layer. The second wetting layer is formed of a different material than the first wetting layer.

In one embodiment, an optical device is provided. The device includes a substrate, an oxide-containing dielectric film disposed on and in contact with the substrate, a wetting layer disposed on and in contact with the dielectric film, and a metal-containing film disposed on and in contact with the wetting layer. The metal-containing film includes one or more of aluminum, silver, and gold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to methods and materials for optical device fabrication. In one embodiment, a method of fabricating an optical device is provided. The method includes depositing a dielectric film on a substrate, depositing a wetting layer on the dielectric film, and depositing a metal containing film on the wetting layer. In another embodiment, an optical device is provided. The device includes a substrate, a dielectric film deposited on and contacting the substrate, a wetting layer deposited on and contacting the dielectric film, and a metal containing film deposited on and contacting the wetting layer.

Figure 1:
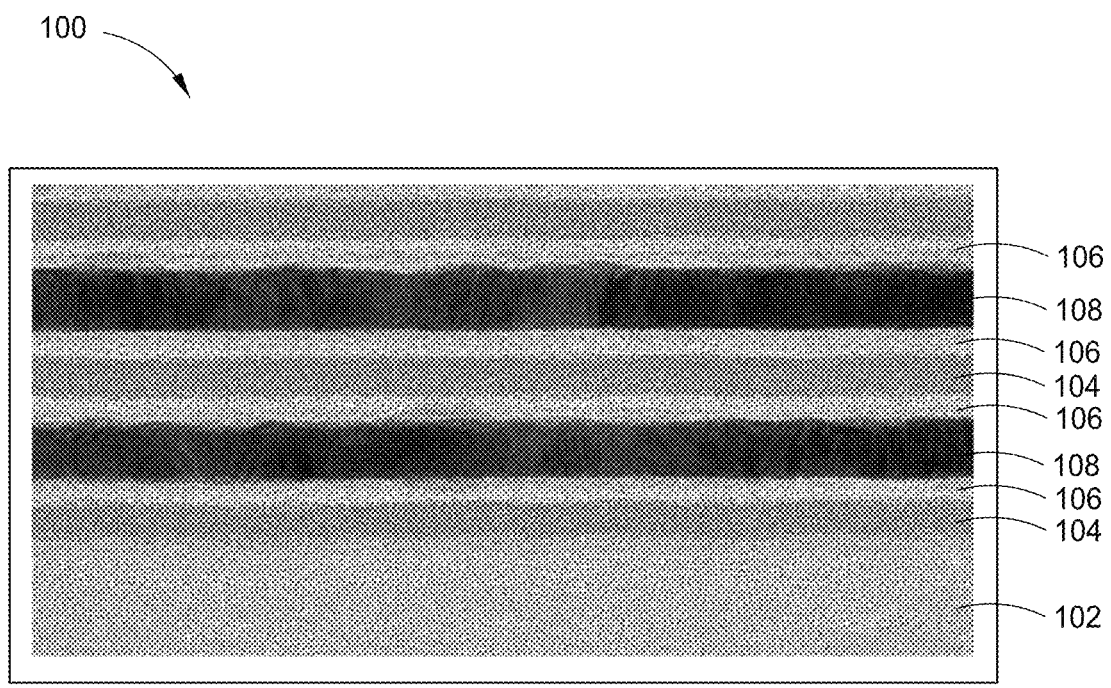
FIG. 1 is a micrograph illustrating a film stack having a wetting layer disposed between a dielectric film and a metal containing film according to an embodiment described herein.

FIG. 1 is a micrograph illustrating a film stack having a wetting layer disposed between a dielectric film and a metal containing film. An optical device 100 includes a substrate 102. The substrate 102 may be any suitable substrate on which an optical device may be formed. In one embodiment, the substrate 102 is a silicon (Si) containing substrate. It is also contemplated that the substrate 102 may be an indium (In), gallium (Ga), germanium (Ge), or nitrogen (N) containing substrate. Alternatively or additionally, the substrate 102 may be a layered substrate.

A dielectric film 104 is deposited on and in contact with the substrate 102. In one embodiment, the dielectric film 104 is a semiconducting material. Suitable examples of semiconducting materials include, but are not limited to: silicon (Si) materials, germanium (Ge) materials, silicon nitride ($Si_3N_4$) materials, indium phosphide (InP) materials, gallium phosphide (GaP) materials, gallium nitride (GaN) materials, and III-V materials or the like. In one embodiment, the dielectric film 104 is an oxide containing film, such as a titanium dioxide ($TiO_2$) film, a hafnium oxide (Hf$_x$O$_y$) film, a zirconium oxide (ZrO$_2$) film, a lanthanum oxide (La$_2$O$_3$) film, an aluminum oxide (Al$_2$O$_3$) film, or the like. Alternatively or additionally, the dielectric film 104 may be a multi-layered stack. The material selected for the dielectric film 104 is selected, at least in part, due to the index of refraction inherent to the material. It is also contemplated that the dielectric material may exhibit hydrophobic characteristics under certain conditions.

In one embodiment, the dielectric film 104 is deposited on the substrate 102 by a physical vapor deposition (PVD) process. Alternatively, the dielectric film 104 may be deposited by other techniques, such as a chemical vapor deposition (CVD) process, a plasma enhanced chemical vapor deposition (PECVD) process, an epitaxial vapor deposition process, an atomic layer deposition (ALD) process, or the like. In certain embodiments, the dielectric film 104 is deposited to a thickness of between about 2 nm and about 8 nm, such as about 3 nm. In one embodiment, the dielectric film 104 is deposited to a thickness of about 5 nm.

A wetting layer 106 is deposited on and in contact with the dielectric film, 104. In one embodiment, a wetting layer is a material which provides a surface upon which a deposited material may initially form islands of growth having obtuse contact angles with an underlying material layer, for example, the dielectric film 104 or the like. The wetting layer functions to improve the formation of a subsequently deposited film such that the subsequently deposited film is smooth, continuous, and thin. In one embodiment, the subsequently deposited film is a metal containing film 108.

In one embodiment, the wetting layer 106 is a semiconducting material. In another embodiment, the wetting layer 106 is a dielectric material. Suitable examples of semiconducting and dielectric materials include, but are not limited to: silicon (Si) materials, silicon oxide (SiO$_2$) materials, silicon nitride (Si$_3$N$_4$) materials, tantalum oxide (TaO) materials, aluminum oxide (Al$_2$O$_3$) materials, gallium phosphide (GaP) materials, gallium nitride (GaN) materials, and III-V materials or the like. In another embodiment, the wetting layer 106 is a metallic material. Examples of suitable materials for the metallic wetting layer include, but are not limited to: titanium (Ti) materials, chromium (Cr) materials, nickel (Ni) materials, and cobalt (Co) materials.

The wetting layer 106 is formed over the dielectric film 104 in a thin layer which functions to enhance the deposition of the subsequently deposited metal containing film 108. In one embodiment, the wetting layer 106 is deposited on the dielectric film 104 by a PVD process. Alternatively, the wetting layer 106 may be deposited by other techniques, such as a chemical vapor deposition (CVD) process, a plasma enhanced chemical vapor deposition (PECVD) process, an epitaxial vapor deposition process, an atomic layer deposition (ALD) process, an evaporation process, a molecular beam deposition process, or the like.

The metal containing film 108 is deposited on and in contact with the wetting layer 106. In one embodiment, the metal containing film 108 is a reflective metallic material, such as aluminum (Al), silver (Ag), or gold (Au), among others. The wetting layer 106, which forms a thin and smooth surface on the dielectric film 104, facilitates uniform deposition of the metal containing film 108 thereon. It is believed that the wetting layer 106 increases the variety of materials which can be utilized as the metal containing film 108 while reducing the thickness of the metal containing film 108 utilized to achieve uniform or substantially uniform film thickness of the metal containing film 108. In one embodiment, another wetting layer 106 is deposited on the metal containing film 108 such that the metal containing film 108 is sandwiched between two wetting layers 106. In this embodiment, each of the wetting layers 106 is formed in contact with the metal containing film 108.

Figure 2:
FIG. 2 schematically illustrates a film stack according to an embodiment described herein.

FIG. 2 schematically illustrates a film stack 200 according to an embodiment described herein. In this embodiment, the dielectric film 104 is formed on and in contact with the substrate 102, the wetting layer 106 is formed on and in contact with the dielectric film 104, the metal containing film 108 is formed on and in contact with the wetting layer 106, and a second dielectric film 104 is disposed on and in contact with the metal containing film 108. In this embodiment, a single wetting layer 106 is utilized when compared to the example described above, wherein the metal containing film 108 is sandwiched between two wetting layers 106.

Figure 3:
FIG. 3 schematically illustrates a film stack according to an embodiment described herein.

FIG. 3 illustrates a film stack 300 according to an embodiment described herein. In this embodiment, the dielectric film 104 is formed on and in contact with the substrate 102, a first wetting layer 106a is formed on and in contact with the dielectric film 104, the metal containing film 108 is formed on and in contact with the first wetting layer 106a, a second wetting layer 106b is formed on and in contact with the metal containing film 108, and the dielectric film 104 is disposed on and in contact with the second wetting layer 106b.

In one aspect of this embodiment, the first wetting layer 106a is a dielectric or semiconducting material and the second wetting layer 106b is a metallic material. For example, the first wetting layer 106a may be a silicon (Si), silicon oxide (SiO$_2$), silicon nitride (Si$_3$N$_4$), tantalum oxide (TaO), aluminum oxide (Al$_2$O$_3$), gallium phosphide (GaP), gallium nitride (GaN), or III-V material containing layer, while the second wetting layer 106b may be a titanium (Ti), chromium (Cr), nickel (Ni), or cobalt (Co) containing layer. Other materials and combinations are also contemplated. For example, in another aspect, the first wetting layer 106a is a metallic material, and the second wetting layer 106b is a dielectric or semiconducting material. In both aspects, the dielectric or semiconducting material wetting layer functions as part of a dielectric portion (i.e. dielectric film 104) of the optical device and the metallic material wetting layer functions similarly to a metallic portion (i.e. metal containing film 108) of the optical device. In certain aspects, the metallic wetting layer is incorporated, by diffusion or the like, into the metal containing film 108 by an annealing process or the like. In one embodiment, the metal containing film 108 is deposited by a PVD process. One example of a suitable apparatus for performing the PVD processes for depositing the dielectric film 104, the wetting layer 106, and/or the metal containing film 108 is the ENDURA® series of processing tools available from Applied Materials, Inc., Santa Clara, Calif. It is also contemplated that other suitably configured apparatus from other manufacturers may also be utilized to deposit the dielectric film 104, the wetting layer 106, and/or the metal containing film 108. Alternatively, the metal containing film 108 may be deposited by other techniques, such as a chemical vapor deposition (CVD) process, a plasma enhanced chemical vapor deposition (PECVD) process, an epitaxial vapor deposition process, an atomic layer deposition (ALD) process, or the like.

It is believed that the utilization of wetting layers enables an increase in the variety of materials suitable for use in the creation of multi-layer stacks for optical devices, such as color filters or plasmonic devices. Other devices which benefit from the methods, materials, and devices described herein include Fabry-Perot interferometers and etalon devices. More specifically, the thickness of each material layer 104, 106, 108 in the optical device 100 may be reduced or more finely controlled to enable the fabrication of smoother surfaces and/or interfaces between adjacent material layers.

Methods described herein also include preparation of the substrate 102 for optical device fabrication. In one embodiment, a multi-chamber system is utilized. In one embodiment, the multi-chamber system, such as the ENDURA® series of processing tools, includes an annealing chamber, a surface cleaning chamber (i.e. a sputter etching chamber), and PVD chambers. It is also contemplated that other suitably configured apparatus from other manufacturers may also be utilized to prepare the substrate 102 for optical device fabrication.

Prior to transfer of the substrate 102 into a process chamber and deposition of the dielectric material 104, the substrate 102 is introduced into a load lock chamber where the pressure is reduced and maintained at sufficiently high vacuum, such as a vacuum pressure similar to that utilized in the PVD chambers. Substrate preparation, in certain embodiments, also includes heating to desorb water vapor or a sputter etch to clean the substrate surface to enhance the nucleation characteristics of subsequently deposited films.

Embodiments described herein are believed to find beneficial implementation in various optical devices, such as optical films, color filters, diffractive optics, nano-optics, and super resolution optics, among others. By implementing a metal/metal oxide film with a wetting layer, the color saturation of optical filter devices is maintained and/or improved while enabling a reduced thickness metal layer with improved film smoothness (i.e. reduced surface roughness). It is believed that enabling a thinner film improves optical transmission of the optical device while improving optical performance of the film stack.

While the foregoing is directed to embodiments of the present disclosure, other and further embodiments of the disclosure may be devised without departing from the basic scope thereof, and the scope thereof is determined by the claims that follow.

What is claimed is:

1. A method of fabricating an optical device, comprising:
   heating a substrate;
   depositing a dielectric film on and in contact with the substrate, the dielectric film formed of an oxide-containing material and having a thickness between about 2 nm and about 8 nm;
   depositing a first wetting layer on and in contact with the dielectric film, the first wetting layer comprising a metal selected from the group consisting of titanium, chromium, cobalt, and nickel;
   depositing a metal-containing film on and in contact with the first wetting layer, the metal-containing film formed of a reflective metallic material comprising one or more of aluminum, silver, and gold; and
   depositing a second wetting layer on and in contact with the metal-containing film, the second wetting layer comprising a dielectric material selected from the group consisting of silicon, silicon oxide, tantalum oxide, aluminum oxide, gallium phosphide, and gallium nitride.

2. The method of claim 1, wherein the oxide-containing material is titanium dioxide.

3. The method of claim 1, wherein the dielectric film is a multi-layered stack.

4. The method of claim 1, further comprising:
   etching a surface of the substrate prior to depositing the dielectric film on the substrate.

5. The method of claim 1, wherein one or more of the dielectric film, the first wetting layer, the second wetting layer, or the metal-containing film are deposited by a physical vapor deposition process.

6. The method of claim 1, wherein the first wetting layer is incorporated into the metal layer by an annealing process.

7. The method of claim 1, wherein heating the substrate occurs prior to depositing the dielectric film, and wherein heating the substrate comprises:
   transferring the substrate into a process chamber from a load lock chamber; and
   heating the substrate to desorb water vapor.

8. The method of claim 1, wherein a second dielectric layer is formed over the second wetting layer.

9. A method of fabricating an optical device, comprising:
   heating a substrate;
   depositing a dielectric layer on and in contact with the substrate, the dielectric layer formed of an oxide-containing material selected from the group consisting of titanium dioxide, hafnium oxide, zirconium oxide, lanthanum oxide, and aluminum oxide, the dielectric layer having a thickness between about 2 nm and about 8 nm;
   depositing a first wetting layer on and in contact with the dielectric layer, the first wetting layer comprising a metal selected from the group consisting of titanium, chromium, cobalt, and nickel;
   depositing a metal-containing film on and in contact with the first wetting layer, the metal-containing film formed of a reflective metallic material comprising one or more of aluminum, silver, and gold; and
   depositing a second wetting layer on and in contact with the metal layer, the second wetting layer comprising a dielectric material selected from the group consisting of silicon, silicon oxide, tantalum oxide, aluminum oxide, gallium phosphide, and gallium nitride.

10. The method of claim 9, wherein the oxide-containing material is titanium dioxide.

11. The method of claim 9, wherein a second dielectric layer is formed over the second wetting layer.

12. The method of claim 9, wherein one or more of the dielectric layer, the first wetting layer, the second wetting layer, or the metal layer are deposited by a physical vapor deposition process.

13. A method of fabricating an optical device, comprising:
   depositing a first dielectric layer over and in contact with a surface of a substrate via physical vapor deposition, the first dielectric layer comprising titanium oxide and having a thickness between about 2 nm and about 8 nm;
   depositing a first metal layer over and in contact with the titanium oxide layer, the first metal layer consisting of titanium, chromium, cobalt, or nickel;
   forming a second metal layer over the first metal layer, the metal layer comprising one or more of aluminum, silver, and gold; and
   depositing a second dielectric layer over the second metal layer, the second dielectric layer consisting of silicon or silicon oxide.

14. The method of claim 13, further comprising:
   depositing a titanium oxide layer over the second dielectric layer.

* * * * *